Nov. 5, 1935.  G. E. CORBY ET AL  2,019,656

FREIGHT VEHICLE

Filed Jan. 7, 1933  4 Sheets-Sheet 1

INVENTOR.
George E. Corby and
Harry C. Tunberg
BY
Fay, Oberlin & Fay
ATTORNEYS

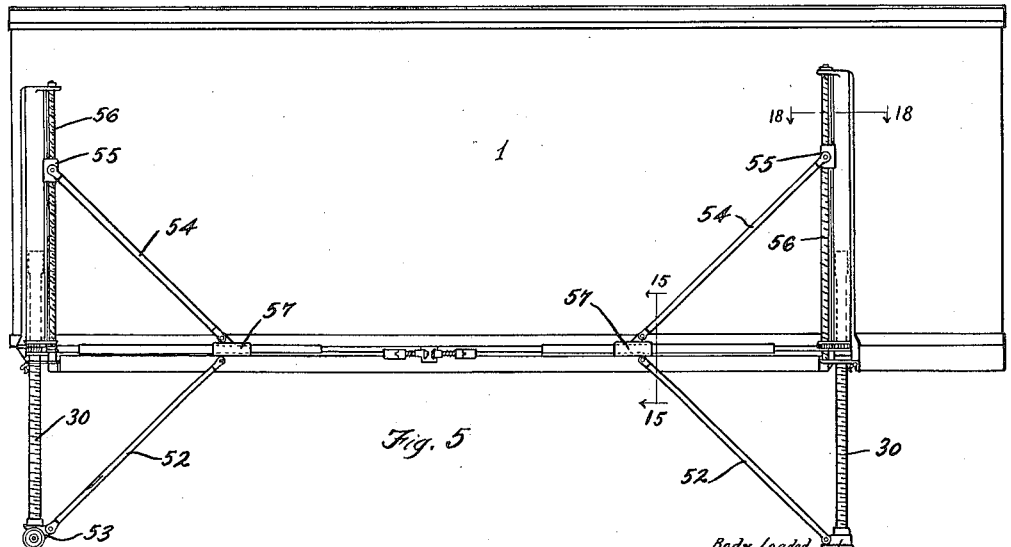
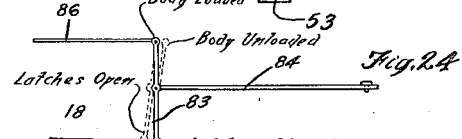
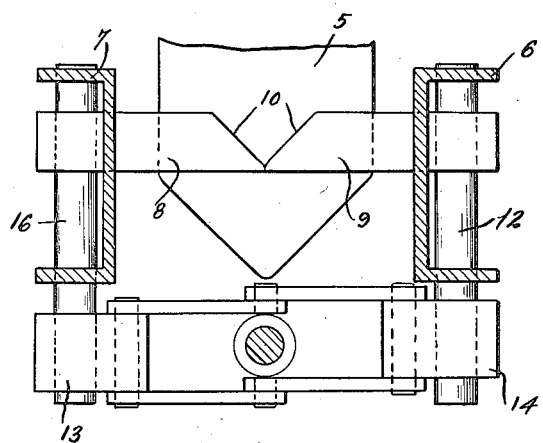
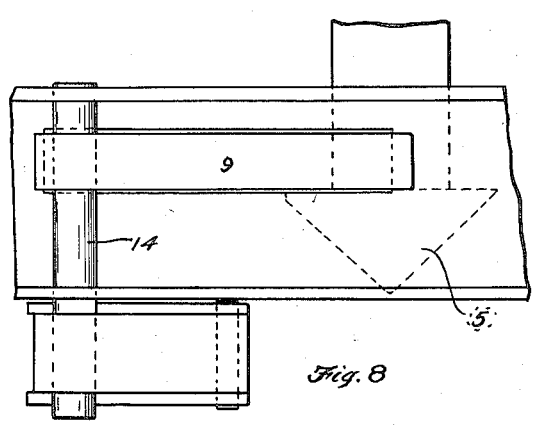
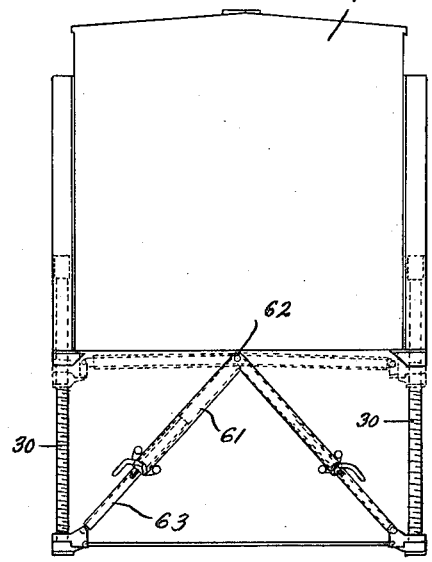

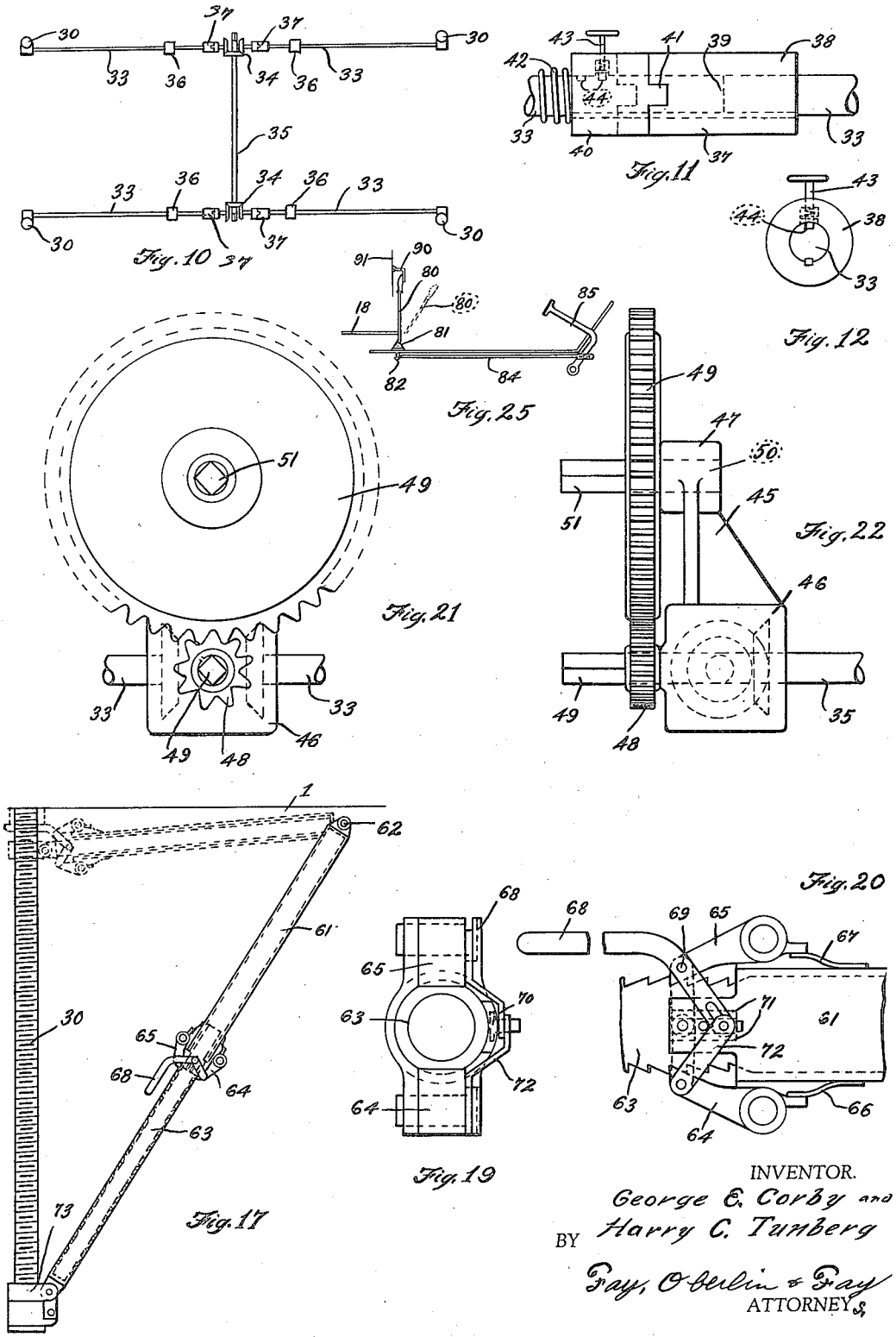

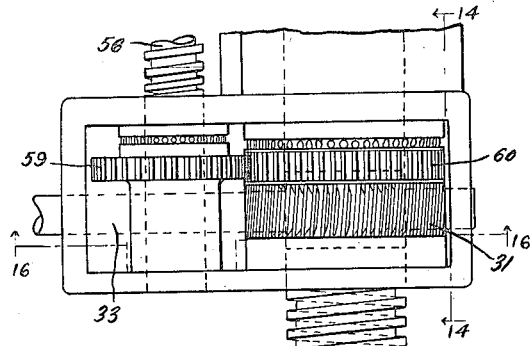
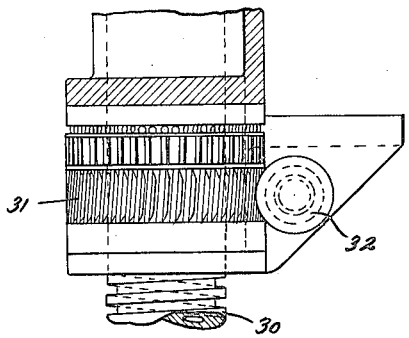
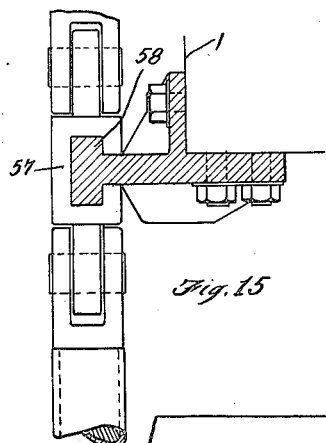
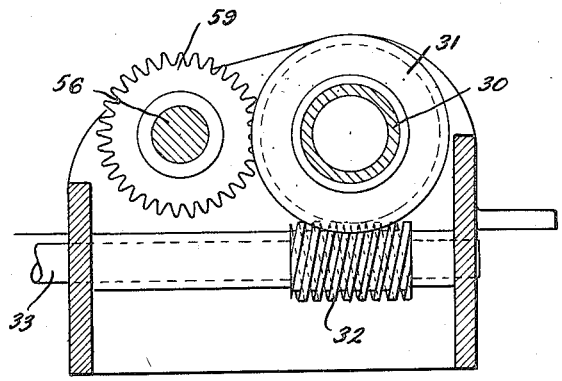
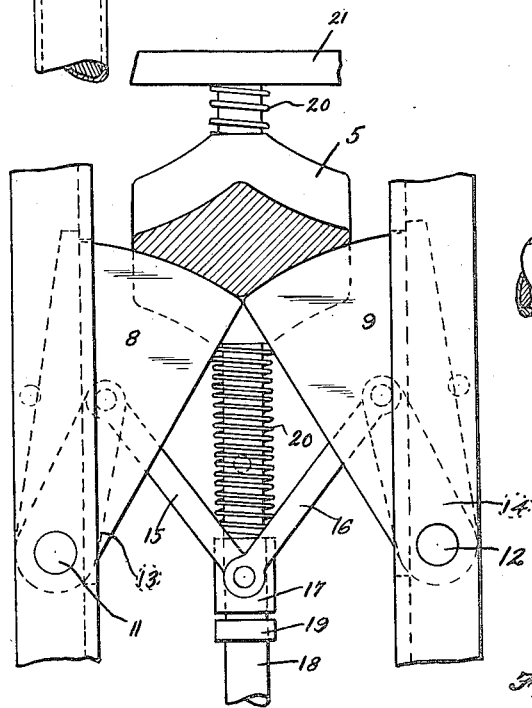
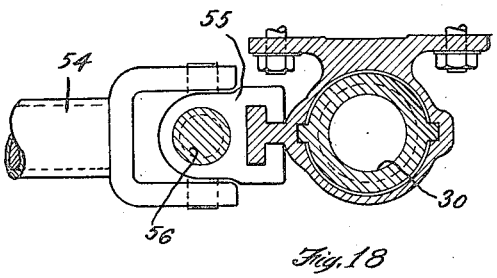

UNITED STATES PATENT OFFICE 2,019,656

FREIGHT VEHICLE

George E. Corby, Rocky River, and Harry C. Tunberg, Lakewood, Ohio, assignors to Corby-Tunberg, Inc., Cleveland, Ohio, a corporation of Ohio Application January 7, 1933, Serial No. 650,634

7 Claims. (Cl. 254—45)

The present invention relating as indicated to a freight vehicle, has more particular reference to a motor truck body which is separable and readily removable from a vehicle chassis. More precisely our invention contemplates the provision of means for locking such removable body on the chassis against both vertical and longitudinal movement; means for supporting the separable body independently; and safety means for preventing the inadvertent removal of the chassis from beneath the body during loading or unloading. Additional objects and advantages of the present invention shall become apparent as the following description proceeds. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 4:
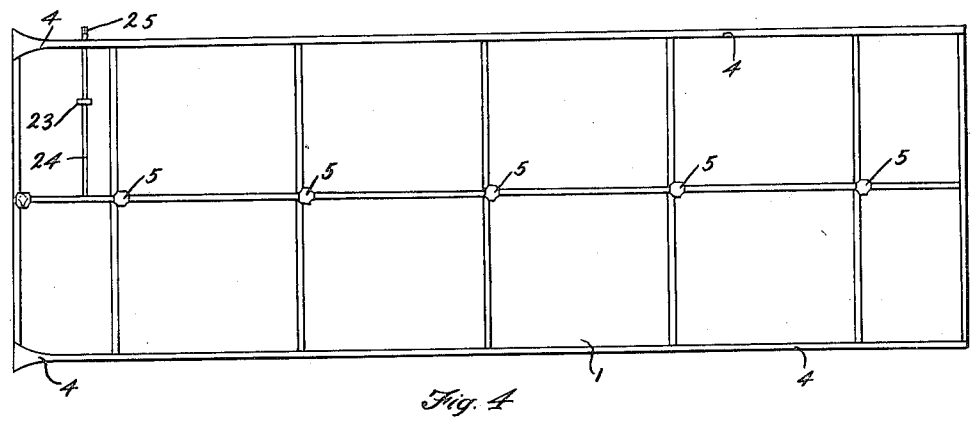
Figure 3:
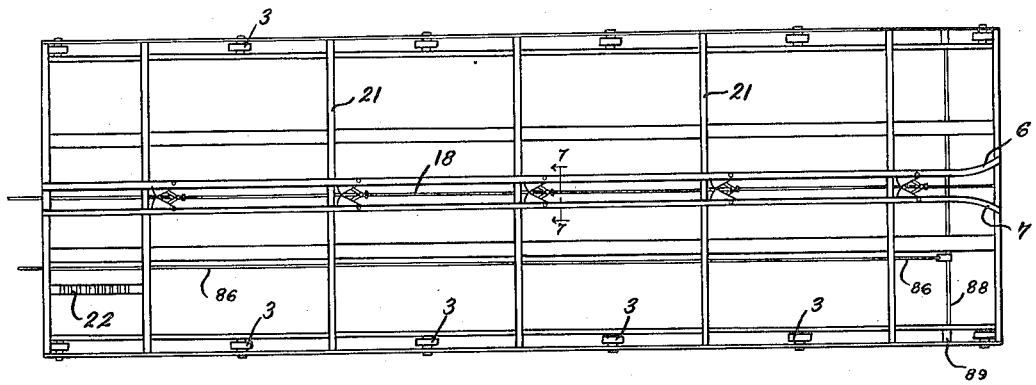
Figure 1:
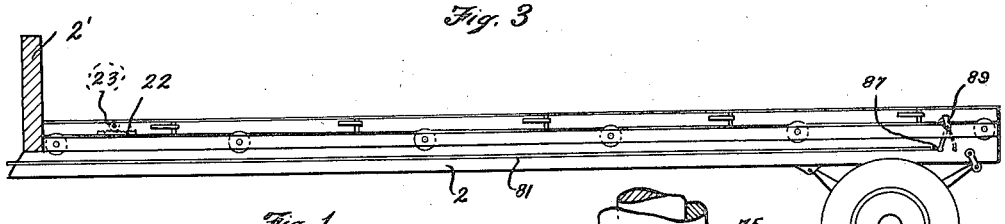
Figure 23:
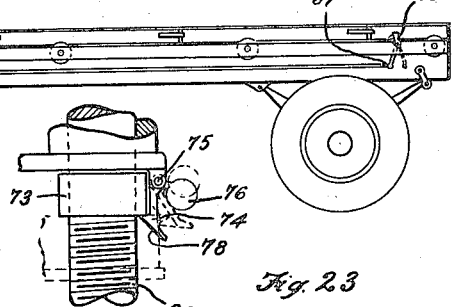
Figure 2:
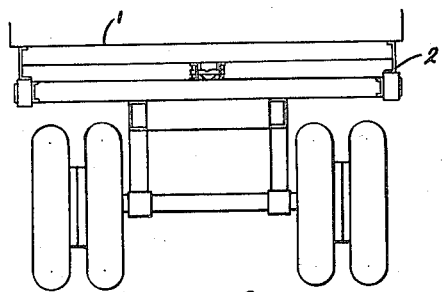

In said annexed drawings:

Fig. 1 is a side elevation of the rear portion of a truck chassis; Fig. 2 is an elevational view taken on a plane normal to the right end of Fig. 1; Fig. 3 is a top plan view of Fig. 1; Fig. 4 is a bottom plan view on the under side of the separable body; Fig. 5 is a side elevational view of the separable body elevating mechanism; Fig. 6 is an end elevational view taken upon a plane normal to that of Fig. 5; Fig. 7 is an enlarged sectional detail of the body-retaining latch and taken substantially along the line 7—7 of Fig. 3; Fig. 8 is a side view of Fig. 7; Fig. 9 is a plan view of the mechanism shown in Fig. 7; Fig. 10 is a top plan view of the elevating jack operating mechanism; Figs. 11 and 12 are side and end views of the jaw clutches utilized in the jack operating mechanism of Fig. 10; Fig. 13 is an enlarged detail view of the elevating jack and brace screw gearing connections; Fig. 14 is a sectional view taken substantially upon lines 14—14 of Fig. 13; Fig. 15 is a top sectional view of the brace guide connection; Fig. 16 is a sectional view taken substantially upon the line 16—16 of Fig. 13; Fig. 17 is an elevational view of the elevating jack and brace assembly; Fig. 18 is a sectional view of the elevating jack and brace guide; Figs. 19 and 20 are end and side views respectively of the telescopic brace locking means; Figs. 21 and 22 are front and side elevations respectively of the variable speed cranking mechanism for the elevating jack operating shafts; Fig. 23 is a detail view of the elevating jack and brace guide latch mechanism; and Figs. 24 and 25 are plan and elevational views respectively of the safety clutch locking mechanism.

Body attaching mechanism

Referring now more particularly to Figs. 1 to 4 inclusive, and Figs. 7, 8 and 9, the mechanism for removably securing the separable body indicated generally by the numeral 1 to the truck chassis 2 is constructed as follows: The truck chassis carries a plurality of rollers 3 which are adapted to bear against the roller trackways 4 on the under side of the body. It is to be understood that the rollers 3 may be carried by the removable body 1 instead of by the chassis bed as illustrated in the drawings. This will facilitate the movement of the bed about on a flat platform after the same has been removed from the chassis. The forward end of the body 1 is adapted to abut against the rear frame 2' of the cab of the vehicle which serves as a means for limiting and preventing forward longitudinal movement of the body. The under side of the body carries along its central portion a plurality of downwardly projecting and centrally disposed locking keys 5. A pair of guides 6 and 7 are provided for the locking keys when the chassis is moved under the body.

Now referring to Figs. 7, 8 and 9, it will be seen that the locking keys 5 are shaped in the form of a spear head and are adapted to be engaged by the pivoted latch members 8 and 9. For the purpose of more facile insertion of the locking keys 5 into the latch members 8 and 9, the upper longitudinal surfaces of the latter are beveled as shown at 10. The latches 8 and 9 are carried by the pins 11 and 12, whose lower ends in turn mount the arms 13 and 14 respectively. The latter arms 13 and 14 are connected by means of links 15 and 16 to a sleeve 17 mounted upon the operating shaft 18. A fixed collar 19 on the shaft 18 is adapted to bear against and move the sleeve 17. A compression spring 20 bears against the other side of the sleeve 17 and is mounted against the cross bar 21 on the vehicle chassis.

The operation of the above described latching mechanism is as follows: When the body 1 is lowered into position upon the top of the chassis 2, the locking spear heads 5 are engaged by the latch members 8 and 9 as shown in Fig. 9. When it is desired to remove the body and to release the latching members, the latch-operating shaft 18 is moved in a forward direction, by mechanism to be subsequently herein described, whereby the sleeve 17 is also moved forward and the latches 8 and 9 are swung outwardly from each other, thus releasing their engagement with the locking head 5. It will thus be seen that the above described latching members not only serve to lock the body against vertical movement, but also prevent rearward longitudinal movement due to the fact that a wedging action occurs between the locking keys 5 and the pivot points 11 and 12 of the latch members 8 and 9.

In order to more readily and accurately position the body to the chassis and to move the body with respect to the chassis in event that the latching members become too securely locked during transit, a rack and pinion mechanism consisting of the gear rack 22 and the pinion 23 is provided. The rack 22 is fixedly mounted upon the upper side of the chassis 2. The pinion 23 is carried upon the shaft 24 mounted on the lower side of the body 1. Thus by attaching a crank to the squared end 25 of the pinion shaft 24, it will be seen that it is possible to position and move the body 1 with mechanical advantage relatively to the chassis.

Body elevating mechanism

For the purpose of raising the body from the chassis and supporting the former at the desired height while the chassis is removed or placed in loading position, the mechanism is utilized which is best illustrated in Figs. 5 and 6 and Figs. 10 to 23 inclusive.

This latter mechanism, to refer first to Figs. 5 and 6, consists of a plurality of jack screws 30, which, in the present instance are four in number placed rectangularly about the sides of the body 1. While only four jacks have been illustrated as arranged at the four corners of the body, it is to be noted that if the length of the body is extended to make the use of only four jacks unsatisfactory from a construction standpoint, it is within the contemplation of our invention to provide similar jack legs at spaced points along the sides of the body and such a plurality of jacks may be actuated either simultaneously from a single station, a plurality of stations or by means associated with each of the individual jacks. As shown in Figs. 13, 14 and 16, each of the jack screws 30 carries the interiorly threaded gear 31 which, in turn, is engaged by the worm gear 32. The worm gear 32 is mounted upon the shaft 33.

Now turning to Fig. 10, the shafts 33 are carried to a central point where they are connected by means of beveled gears 34 to the transverse drive shaft 35. A universal joint 36 is installed in the shafts 33 in order to prevent the latter from binding in their journals in the event that the body sags or becomes twisted out of alignment due to excessive loading or the incurrence of shocks while in transit.

Jaw clutches 37 are also provided upon the shafts 33 in order that the jack screws 30 may be raised or lowered to variable heights in the event that the body 1 is to be supported upon uneven ground. The jaw clutches 37 as illustrated in detail in Figs. 11 and 12 consist of the sleeve 38 secured to the end of the shaft 33. The shaft 33 is split along the line 39. The left hand portion of the shaft 33 carries the sleeve 40 which is keyed thereto and adapted to make toothed engagement with the sleeve 38 along the tongue and groove joint 41. The sleeve 40 is spring loaded by means of the coil spring 42 and carries the spring loaded detent 43 which, in turn, is adapted to engage with the slots 44 of the shaft. The detent 43 may be disengaged by hand and the jaw clutch 37 thrown into locked or unlocked position as desired.

A variable speed drive may be provided for operating the above described jack-operating shafts as shown in Figs. 21 and 22. Such drive consists of the supporting casting 45 which carries the beveled gear box 46 and the large gear journal bearing 47. The transverse drive shaft 35 extends through the bevel gear box 46 and carries the small gear 48 and has upon its outer end a squared form 49 adapted to receive a suitable crank. The large gear 49' which meshes with the small gear 48 likewise is mounted upon a shaft 50 which has a squared end 51 also for the reception of an operating crank. The operation of this variable speed cranking mechanism is as follows. When it is desired to raise the body by actuation of the jack screws 30, the crank is placed upon the squared end 49 of the shaft 35 in which case the greater mechanical advantage will be obtained. However, when it is desired to lower the body by reverse actuation of the jack screws 30, the crank is placed upon the squared end 51. Thereby the transverse drive shaft 35 is rotated at a much greater speed, but with a lower mechanical advantage.

Elevating mechanism bracing construction

Now, when the body is elevated by means of the jack screws 30 and held in a supported position thereby, it is obvious that in the event the body 1 is loaded, the center of gravity of the structure is considerably raised from the ground level and that in order to adequately brace such a top-heavy structure, the following devices have been provided.

Now referring back to Figs. 5 and 6, lower braces 52 are connected to the feet 53 of the jack screws 30. For certain uses the feet 53 may be provided with rollers or castors as illustrated at the left end of Figure 5 and it is within the contemplation of our invention to universally mount the feet or castors so that they may accommodate themselves to inclinations in the surface engaged thereby as well as to facilitate movement of the body when it is supported independently of the chassis. Similarly, upper braces 54 are connected to the threaded guides 55 which are in turn engaged by the auxiliary screws 56. The converging ends of the brace members 52 and 54 respectively, are pivotally secured to the guide block 57 (Fig. 15) which is slidable upon the guide rail 58. The guide rail 58 is, in turn, fastened to the lower bottom edge of the body 1.

The screw block 55 which carries the upper ends of the braces 54 is raised and lowered by rotation of the screw 56. As shown in Figs. 13 to 16 inclusive, the screw 56 is directly actuated in unison with the jack screws 30 by virtue of the provision of the gear 59 secured to the screw 56 and in mesh with the gear 60. The latter gear 60 is in turn keyed to the gear 31.

Hence, it will be seen in operation that as the supporting jack screws 30 are lowered or raised that the braces 52 and 54 will accordingly be actuated, whereby a trussed support is maintained between the upper portions of the body 1 and the lower ends 53 of the jack screws 30.

Additional supporting braces, as shown in Fig. 6 and Fig. 17 are provided between the bottom of the body 1 and the lower ends of the jacks 30.

These latter braces consist of a tubular member 61 pivotally secured to the body 1 at the point 62. Telescopically engaged with the interior of the tubular member 61 is the notched member 63. A locking mechanism adapted to maintain the members 61 and 63 against collapsible movement as illustrated in Figs. 19 and 20 consists of the pawls 64 and 65 which are spring loaded into engaging position by the leaf springs 66 and 67 respectively. Disengaging mechanism for the locking pawls 64 and 65 consists of an actuating lever 68 pivoted at the point 69 to the pawl 65 and connected at its maximum leverage end to the guide block 70. The guide block 70 is adapted to travel in a straight line in the guides 71. A link arm 72, in turn, connects the guide block 70 to the other pawl 64. It will thus be seen that the raising of the actuating lever 68 from its position as shown in Fig. 20 will result in forcing the pawls 64 and 65 away from each other whereby the latter are disengaged from the notches in the bracing member 63, enabling the latter to be collapsed or telescoped within the interior of the tubular brace member 61. The lower end of the notched brace member 63 is pivotally carried by the collar 73 which, in turn, engages the jack screw 30. By reference to Fig. 17 it will be seen that the last described bracing mechanism, upon elevating movement of the jack screws 30 may be allowed to assume its position as shown in full lines. When the jack screw is in inoperative position or lowered, the lever 68 is pulled, the braces 61 and 63 are telescoped and assume the position shown in dotted lines in Fig. 17.

In order to provide for automatic operation of the last described bracing member, the latch mechanism (Fig. 23) consists of a latch member 74 pivoted at the point 75 on the housing enclosing the threaded gear 31 and urged into operative position by the weighted arm 76. The latch 74 is adapted to engage with the under side of the collar 73 (Fig. 17). The upper edge of the foot 53 carries a tripping lug 77 which is adapted to engage with the angular face 78 of the latch 74. It will thus be seen that when the bracing members 61 and 63 are collapsed and raised into inoperative position, that the last described latching mechanism will serve to retain them in such latter position. However, upon collapsing or raising of the jack screw 30, it will be seen that the lug 77 will be forced against the face 78 of the latch 74 and permit the collar 73 to drop down against the upper surface of the foot 53, thereby being in a position to follow the jack screw down as it is extended.

*Clutch locking mechanism*

The safety device which is provided for the purpose of preventing the inadvertent movement of the truck chassis during loading or removal of the separable freight body is constructed as follows. Directing attention to Figs. 1, 3, 24 and 25, the latch operating shaft 18 is carried forward to the cab (not shown) of the vehicle and connected to an operating lever 80 which is fulcrumed at the point 81 and hence adapted to impart forward reciprocable motion to the shaft 18. The lower end 82 of the lever 80 is, in turn, connected to the transverse arm 83. The arm 83 is connected at its medial portion with the connecting link 84 leading to the clutch pedal 85; and at its other end to the shaft 86. The shaft 86 (Figs. 1 and 3) leads back the length of the chassis frame and is connected to the short lever arm 87 on the transverse shaft 88. The shaft 88 in turn carries the upwardly projecting dog 89 which is disposed in line with the rollers 3.

The operation of the above described mechanism is as follows. When the chassis 2 is backed under the body 1, or when the loading operation takes place, the dog 89 is depressed whereby the lever arm 87 is thrown to the position shown in dotted lines in Fig. 1 and the shaft 86 is pulled in a rearward direction. Simultaneously the latch operating shaft lever is in its forward position as shown in dotted lines in Fig. 25, which results in throwing the end of the transverse link arm 83 to its extreme left hand position as shown in the dotted lines in Fig. 24. When the two shafts 18 and 86 have been thus actuated, the clutch connecting link 84 will accordingly be pulled to its farthest position towards the rear of the vehicle, with the result that the clutch pedal 85 will be retained in inoperative position, and it will be impossible to connect the drive or transmission mechanism of the vehicle whereby it might be moved during the loading operation. After the freight body 1 has been satisfactorily positioned upon its supporting chassis 2, the latch operating shaft lever 80 is pulled back to its position as shown in full lines in Fig. 25; and locked in such position by such means as a bracket 90 attached to the wall 91 of the vehicle cab. Such movement of the operating lever 80 has the effect of closing the latches and throwing the transverse connecting arm 83 to its forward position as shown by full lines in Fig. 24, at which position the clutch connecting arm 84 will be permitted to move forwardly and thereby release the clutch pedal 85 from its locked position. The above described operations are, of course, reversed when the unloading of the freight body occurs.

It should be further noted that the above described embodiment of our invention may be modified to the extent that the freight body 1 may be constructed in a plurality of links shorter than that of the chassis frame 2 whereby one or more of such shorter lengths may be accommodated by the chassis. For example, if the single chassis has a supporting surface length of twenty-one feet, the freight body may be divided up into individual units of seven feet each, so that three of the latter may be supported upon the chassis.

A removable body which forms a part of the hereinbefore described invention is particularly well adapted for a number of uses in addition to its defined use as a freight container. For instance, such body may be a combined office and tool shed for a construction project, so that all of the tools as well as the office equipment for a particular project may be rendered substantially as mobile as if it were mounted on a truck.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:

1. In a freight vehicle, the combination of a chassis, a freight-carrying body, a bed on said chassis for the support of said body, and a plurality of adjustable length legs carried by said body for supporting, raising and lowering the latter independently of said chassis, adjustable length posts extending up the sides of said body and positioned at points adjacent said legs, and bracing members carried by said posts and said legs and connected with the base of said body.

2. In a freight vehicle, the combination of a chassis, a freight-carrying body, a bed on said chassis for the support of said body, and a plurality of adjustable length legs carried by said body for supporting, raising and lowering the latter independently of said chassis, and telescopic bracing members secured to the base of said body and engaging with said supporting legs.

3. In a freight vehicle, the combination of a chassis, a freight-carrying body, a bed on said chassis for the support of said body, a plurality of adjustable length legs carried by said body for supporting, raising and lowering the latter independently of said chassis, telescopic bracing members secured to the base of said body and engaging with said supporting legs, and means on said bracing members for locking the latter in variable length positions.

4. In a freight vehicle, the combination of a chassis, a freight carrying body, a bed on said chassis for the support of said body, and means for supporting, raising and lowering said body independently of said chassis comprising a plurality of extensible legs carried by said body, and means for laterally bracing such legs, said last named means movable during extension of said legs to at all times laterally support the same as said body is raised and lowered.

5. In a freight vehicle, the combination of a chassis, a freight-carrying body, a bed on said chassis for the support of said body, a plurality of internally-threaded gear wheels mounted near the sills of said body for rotation in a horizontal plane, vertically adjustable legs mounted through said gears, having screw threads in engagement therewith, means holding said legs against rotative movement, and means adapted to rotate said gear wheels, comprising gears mounted in engagement therewith and means driving said gears from a single source of power, and screw shafts revolvably mounted and extending upwardly along said body adjacent said legs, gear-wheels affixed to said shafts and in engagement with said first-named gear-wheels, movable blocks threadedly engaging said shafts, an element slidably mounted for horizontal movement near the sills of said body, and paired braces pivotally connected to said element by one end and pivotally connected to one of said legs and to one of said blocks by their opposite ends respectively.

6. In a freight vehicle, the combination of a chassis, a freight-carrying body, a bed on said chassis for the support of said body, a plurality of adjustable length vertical legs mounted in devices near the sill of said body which devices restrain said legs against movement other than longitudinal, posts mounted adjacent said legs and extending up the sides of said body, blocks adjustably mounted on said posts, an element slidably mounted for horizontal movement near a sill of said body and adjacent a leg, braces pivotally connected to said element and by their opposite ends pivotally attached to one of said blocks and to one of said legs respectively, and means adapted to move said legs longitudinally.

7. In a freight vehicle, the combination of a chassis, a freight-carrying body, a bed on said chassis for the support of said body, a plurality of adjustable length legs carried by said body for supporting, raising and lowering the latter independently of said chassis, screw shafts extending up the sides of said body and positioned at points adjacent said legs, blocks threadably mounted on said shafts, actuating means for raising and lowering said blocks and said legs coordinately, elements slidably mounted on said body, and paired braces pivotally connected to said elements, one of said paired braces being also pivotally connected to one of said legs and the other pivotally connected to said block on the shaft adjacent said leg.

GEORGE E. CORBY.
HARRY C. TUNBERG.